Feb. 5, 1929.

F. X. BERNET ET AL 1,700,993

SILENCER FOR INTERNAL COMBUSTION ENGINES

Filed May 9, 1927

Inventors
FRANZ XAVIER BERNET,
PAUL JOHN LUTHY,

BY Toulmin & Toulmin

Attorneys

Patented Feb. 5, 1929.

1,700,993

UNITED STATES PATENT OFFICE.

FRANZ XAVIER BERNET AND PAUL JOHN LUTHY, OF PERTH, WESTERN AUSTRALIA, AUSTRALIA.

SILENCER FOR INTERNAL-COMBUSTION ENGINES.

Application filed May 9, 1927. Serial No. 189,803.

This invention relates to a silencer for internal combustion engines.

Silencers as hitherto constructed have not been entirely satisfactory, as either their muffling efficiency has been poor, or else in use they have entailed undue loss of engine power.

The present invention concerns a silencer that has a high silencing efficiency, and which does not unduly influence the power of the engine.

The invention consists broadly in certain combinations of parts whereby the exhaust gases are on a plurality of occasions divided and caused to traverse a circuitous path, re-united, and ultimately passed to the atmosphere.

Reference is hereby made to the accompanying drawings, in which:—

Figure 1:
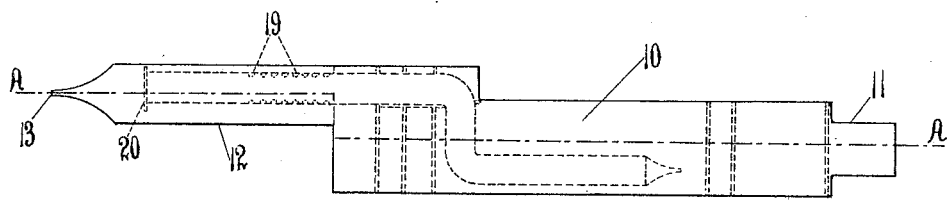
Figure 1 is a plan of a silencer, and:—
Figure 2:
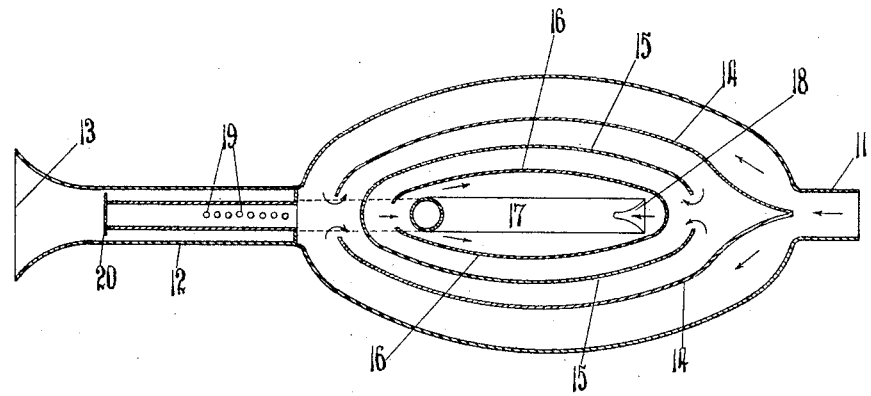
Fig. 2 is a rear sectional elevation on the line A—A of Fig. 1.

In these drawings, 10 is the body of the silencer, 11 is an inlet conduit, and 12 is a conduit conveniently terminating in a fish tail exit slit 13.

Inside the body of the silencer are a plurality of curved concentric pairs of dividing walls or divisions such as 14, 15 and 16. These walls extend for the complete width of the body 10, but alternately have an opening at one end or the other. Thus, as illustrated, the walls 14 are open at the left side, the walls 15 at the right, and the walls 16 at the left. Positioned in the space formed by the dividing walls 16 is an exhaust conduit 17 that has an opening 18. Such conduit extends into the conduit 12, where it has vents 19. A baffle 20 is interposed between such vents and the exit slit 13.

The silencer operates as follows:—

Exhaust gases enter by conduit 11, are then divided by the dividing walls 14 so as either to travel in a circuitous clockwise or in a circuitous anti-clockwise direction. The gases ultimately re-unite and pass through the space between the other end of the walls 14. The gases are then divided by the walls 15. Subsequently, the gases, after re-uniting, are divided by the walls 16. After passing around the outside of the exhaust conduit 17, they pass into the open end 18. After passing along such conduit, the gases pass out of the vents 19 and so reach the space between the conduits 17 and 12, from whence after meeting the baffle 20, they pass into the atmosphere through the fish-tail exit slit 13.

It is to be understood that the body of the silencer need not be egg-shaped in outline. In fact, when used for motor-cycles, an ornamental exterior outline would be preferable.

We claim:—

In a silencer for internal combustion engines, a body having inlet and outlet passages at opposite ends, a plurality of curved dividing walls spaced from said body and from each other to form passageways, each wall having an opening and the several walls being so disposed that the opening in one wall is opposite a closed portion in an adjacent wall, and an exhaust conduit extending from the space within the innermost wall to the outlet passage, a plurality of vents formed in that part of the exhaust conduit extending into the outlet passage, and a baffle for said exhaust conduit.

Dated this twenty-first day of March, 1927.

FRANZ XAVIER BERNET.
PAUL JOHN LUTHY.